United States Patent
Fessler et al.

(10) Patent No.: US 7,437,128 B1
(45) Date of Patent: *Oct. 14, 2008

(54) PORTABLE INTERFERENCE-GENERATING DEVICE FOR USE IN CDMA MOBILE TESTING

(75) Inventors: Braden J. Fessler, Lee's Summit, MO (US); Nick J. Baustert, Olathe, KS (US); Cesar Perez, Olathe, KS (US); William G. Smith, Grandview, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/866,993

(22) Filed: Oct. 3, 2007

Related U.S. Application Data

(63) Continuation of application No. 11/118,857, filed on Apr. 29, 2005, now Pat. No. 7,302,234, which is a continuation-in-part of application No. 10/883,251, filed on Jun. 30, 2004, now Pat. No. 7,240,252.

(51) Int. Cl.
*H04B 17/00* (2006.01)

(52) U.S. Cl. .............. 455/67.13; 455/67.11; 455/67.14; 455/423; 455/222; 714/712

(58) Field of Classification Search .............. 455/67.13, 455/67.11, 67.14, 423, 222, 223, 278.1; 714/712, 714/704

See application file for complete search history.

(56) References Cited

U.S. PATENT DOCUMENTS

| | | | | |
|---|---|---|---|---|
| 3,753,089 A | * | 8/1973 | Gunn et al. | 324/529 |
| 3,956,601 A | * | 5/1976 | Harris et al. | 379/21 |
| 4,272,846 A | * | 6/1981 | Muratani et al. | 455/296 |
| 4,507,661 A | * | 3/1985 | Hoover et al. | 342/351 |
| 5,488,704 A | * | 1/1996 | Fujimoto | 704/219 |
| 5,943,331 A | * | 8/1999 | Lavean | 370/335 |
| 6,226,604 B1 | * | 5/2001 | Ehara et al. | 704/207 |
| 6,898,197 B1 | * | 5/2005 | Lavean | 370/335 |
| 7,240,252 B1 | * | 7/2007 | Fessler et al. | 714/712 |
| 7,302,234 B1 | * | 11/2007 | Fessler et al. | 455/67.13 |
| 2007/0287397 A1 | * | 12/2007 | Han et al. | 455/208 |

OTHER PUBLICATIONS

"Cell Phone Jammer—SH066PL2A/B", http://www.globalgadgetuk.com/Personal.htm, printed from World Wide Web on Jun. 29, 2004.

(Continued)

*Primary Examiner*—Minh D Dao

(57) ABSTRACT

A portable interference-generating device for inducing desired frame error characteristics, such as desired frame error patterns and rates, at a mobile unit receiving a carrier signal having at least one data channel having a plurality of data frames. The induced frame errors may be used to test a digital radio receiver's behavior in the presence of frame errors that may occur as a result of various impairments in a CDMA wireless communication channel. The portable interference-generating device includes a noise source that provides a noise signal and a pulse generator that is used to gate the noise signal according to a desired frame error characteristic at the mobile unit. The gated noise signal is provided to the mobile unit via a coupling element, which preferably couples the gated noise signal directly to an antenna radiation element on the mobile unit.

20 Claims, 7 Drawing Sheets

OTHER PUBLICATIONS

"Digital Cell Phone Jammers", http://www.spymodex.com/jammer.htm, printed from World Wide Web on Jun. 29, 2004.

"Counter Surveillance", http://www.spystoreuk.com/csdetail.html, printed from World Wide Web on Jun. 29, 2004.

I. Mowete, "Cell Phone Detectors and Jammers", http://www.sun-newsonline.com/webpages/features/cybersun/2004/aug/30/cybersun-aug30-2004-006.htm, Aug. 30, 2004.

G. Mangamma et al., A Microprocessor-controlled Programmable Pulse Generator, appeared in J. Phys. E: Sci. Instrum. 20: pp. 100-101 (1987), received Jan. 3, 1986.

L.E. Miller, "Tutorial: Effects of Pulsed Interference", IEEE P802.15-03/504r0), Nov. 2003.

W.W. Ali-Ahmad, "The CDMA Receiver System in an IS-98-A Standard", Electronics Engineer, Jul. 2000.

U.S. Appl. No. 11/118,857, filed Apr. 29, 2005.

\* cited by examiner

PORTABLE INTERFERENCE-GENERATING DEVICE FOR USE IN CDMA MOBILE TESTING

REFERENCE TO RELATED APPLICATIONS

This is a continuation of U.S. patent application Ser. No. 11/118,857 filed on Apr. 29, 2005, which is a continuation-in-part of U.S. patent application Ser. No. 10/883,251, filed Jun. 30, 2004.

BACKGROUND

1. Field of Invention

The present invention is related to wireless communication systems, and more particularly, to a system of controlling forward frame error rates and frame error patterns in a CDMA mobile testing. In one test application, the system is particularly useful in evaluating a mobile station's vocoder response to specified frame error rates and frame error patterns.

2. Description of Related Art

Voice coders, or "vocoders," (or codecs) are used to convert voice signals into digital data packets or data streams that may then be transmitted over a digital data communication channel. In a typical wireless phone or data service, such as the widely used CDMA and GSM cellular phone systems, vocoders are designed using various speech coding algorithms (e.g., RCELP (relaxed code-excited linear predictive coding), ACELP (algebraic code excited linear prediction), etc.), which have been standardized in the CDMA networks (e.g., EVRC (enhanced variable rate coder, as described in IS-127), Q13 (as described in IS-733), and SMV (selectable mode vocoder, currently under development)) and GSM networks (e.g., EFR (enhanced full rate) and AMR (adaptive multi-rate)). The performance of the vocoder is rated in terms of how well the vocoder reproduces the analog voice-band signal. Typical rating systems used in the wireless communication industry include Perceived Equivalent Speech Quality (PESQ), as further defined in ITU specification P.862, Mean Opinion Score (MOS), as further defined in ITU specification P.80, and Perceptual Analysis Measurements System (PAMS) developed by British Telecom, which are objective standardized methods of voice quality scoring. In addition, TTY (Teletypewriter) coder performance may be evaluated using a character error rate.

In a typical wireless communication system, the communication channel is the source of most of the impairments between a base transceiver station (BTS) and a mobile subscriber unit, such as a cell phone. Typically, the errors in a wireless system are caused by various channel impairments such as additive noise, power fluctuations (most commonly due to Raleigh fading), radio interference, frequency response variations, nonlinearities, etc. The wireless communication system utilizes error control coding to detect and correct errors within data frames, but the ability to correct errors is limited. In the event the error correcting capacity of the code is exceeded, the entire data frame is marked as an error and is discarded. This is referred to as a frame error, and the number of frame errors compared to the total number of frames is referred to as the frame error rate (FER).

Vocoder performance evaluations also take into account how well the vocoder performs in the presence of errors caused by the communication channel. Numerous test configurations and procedures have been specified by various standards organizations. These traditional methods of measuring vocoder performance, as described in various CDMA Standard test documents, typically use a complex Raleigh fading channel model and converter to closely model the channel characteristics. The Raleigh fader model is designed to check the base station and mobile ability to use forward power control to control FER at a low set point in the presence of fading. This testing model, however, has limitations in its use for determining characteristic behaviors of radios in the presence of frame error excursions beyond the low set point.

Consequently, a test solution that allows more precise control of frame error rates and frame error patterns that overcomes the current limitations is needed.

Further, mobile test setups using traditional lab test equipment typically do not provide much flexibility for testing mobile radios in different environments, such as the field, for example. Thus, a more flexible test solution for testing mobile radios is also desired.

SUMMARY

A portable device that generates interference for inducing desired frame error characteristics at a mobile unit is provided. The induced frame errors may be used to test a digital radio receiver's behavior in the presence of frame errors, such as the ability to handle abnormal frame error excursions beyond a low set point. Such excursions may occur in typical wireless systems, such as a CDMA system, and may cause voice quality or TTY character accuracy to degrade. Further, the portable interference-generating device may provide a user with a more flexible means for conducting various mobile tests, and may be useful for mobile testing in a field.

According to an embodiment of the invention, the portable device includes a noise source that provides a noise signal and a pulse generator that provides a gating signal used for gating the noise signal according to a desired frame error characteristic at a mobile unit receiving a carrier signal having at least one data channel, where the data channel has a plurality of data frames. The device further includes an output port electrically coupled to the noise source for receiving the gated noise signal and a coupling element that connects to the output port. The coupling element serves to provide the gated noise signal to the mobile unit such that the gated noise signal is added to the carrier signal being received at the mobile unit to induce the desired frame error characteristic. In one example, the coupling element couples the gated noise signal directly to an antenna radiation element of the mobile unit.

In a preferred embodiment, the gating signal is a pulse train signal having a duration characteristic and an interval characteristic. Preferably, gating the noise signal with the pulse train signal generates discrete noise bursts of radio frequency noise, where the duration characteristic and the interval characteristic of the pulse train signal induce the duration characteristic and the interval characteristic of the noise bursts. The duration characteristic of the noise bursts may be configured to provide individual noise bursts of sufficient duration to be coincident with, or overlap in time, with a predetermined number of frames. The pulses (and therefore the noise bursts) may be asynchronous or synchronous with the data frames. When added to the carrier signal being received at the mobile unit, the noise bursts may induce a desired frame characteristic that may be a frame error pattern, a frame error rate, or a combination of the two.

According to one particular embodiment, the portable device may include a digital controller and a front-end module that is used to provide the digital controller with information regarding signal characteristics of the carrier signal being received at the mobile unit. The information may include an indication of signal strength of the carrier signal and/or carrier frequency of the carrier signal. In turn, the digital controller may control characteristics of the gated noise signal according to the information from the front-end module. Further, the digitally-controlled portable device may include a user interface, providing the user with means to control one or more functions of the device and/or one or more signal characteristics of the gated noise signal.

BRIEF DESCRIPTION OF FIGURES

Reference is made to the attached drawings, wherein elements that have the same reference numeral designations represent like elements throughout and wherein.

DETAILED DESCRIPTION

1. Overview

Figure 1:
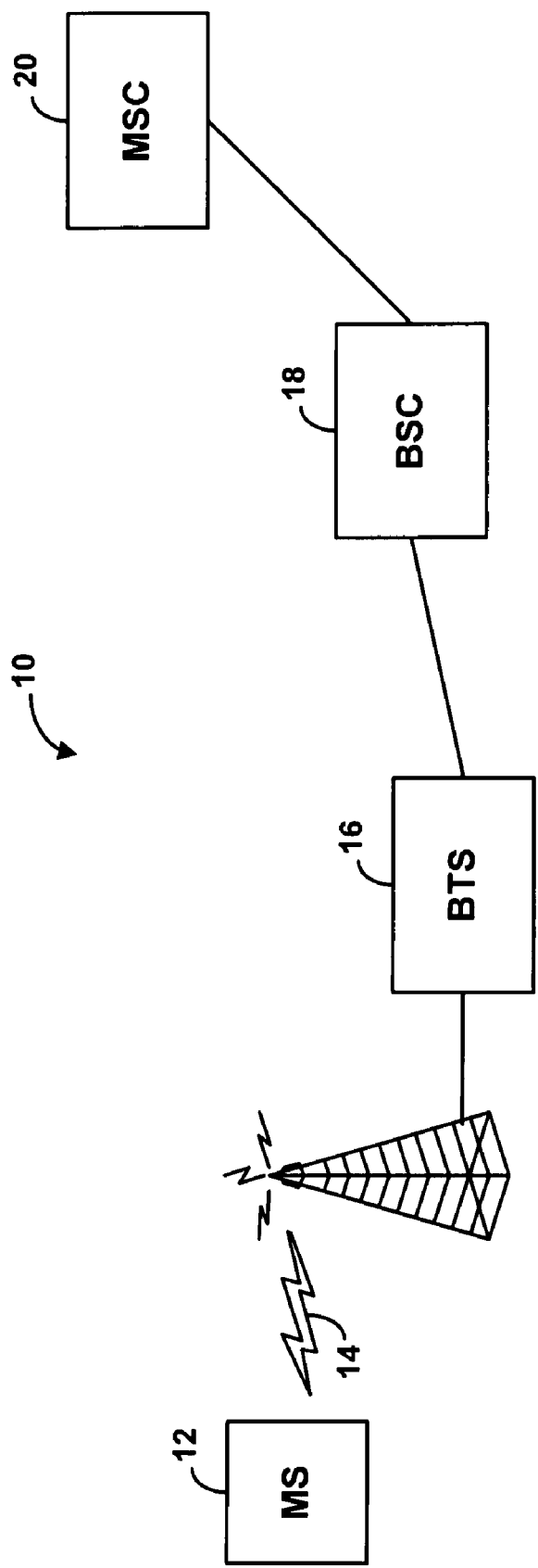
FIG. 1 is a block diagram illustrating one embodiment of a wireless communication system.

Referring now to the drawings, FIG. 1 illustrates a block diagram of a wireless communication system 10. As illustrated in FIG. 1, a mobile station (MS) 12 communicates with a mobile switching center (MSC) 20 via a radio air interface 14, a base transceiver station 16 (BTS), and a base station controller (BSC) 18. The combination of the BTS and the BSC is often referred to as a base station. User communications, such as digitized speech and TTY signals, and other types of data, are transmitted from the BTS to the mobile station over a radio channel, also known as a forward channel (or a "forward traffic channel", as in a CDMA air interface, when referring to a forward channel used for carrying user traffic as opposed to other forward channels used for carrying base station control data).

The format of the forward-channel signal consists of data frames modulated onto a radio frequency (RF) carrier signal, where each frame typically carries a block of vocoder payload information. In a CDMA system, frames from multiple users are separated by user-unique patterns of ones and zeros used to represent user data, and may therefore be transmitted at the same time and carrier frequency. As the data is carried through radio air interface 15, noise or other channel impairments associated with the radio air interface may interfere with the signal and corrupt the data, resulting in data errors.

Normally, each data frame is protected using error-correcting codes that provide a mechanism to detect and correct a certain number of errors. On the forward link (i.e., a base station-to-mobile station communication link), a combination of cyclic redundancy check (CRC), data interleaving, and/or convolutional encoding is typically used to detect and correct errors in a data frame. As an example, the EVRC algorithm often employed in CDMA systems reduces the number of bits per frame that are dedicated to pitch representation of a voice signal, allowing additional bits to be dedicated to channel impairment protection.

In the event, however, the errors cannot be corrected at a mobile station, the entire data frame is discarded, resulting in a frame error. A sufficient number of frame errors may cause, for example, a dropped call, degraded voice quality (e.g., distorted speech), or, in the case of TTY applications, character errors including missing characters, extra characters, and/or substituted characters. Testing the mobile station for scenarios involving forward-channel frame errors may be thus particularly useful to ensure that the mobile station is able to provide adequate voice/audio/data quality and TTY accuracy (if TTY-capable) to a mobile user in the presence of frame errors.

Figure 2:
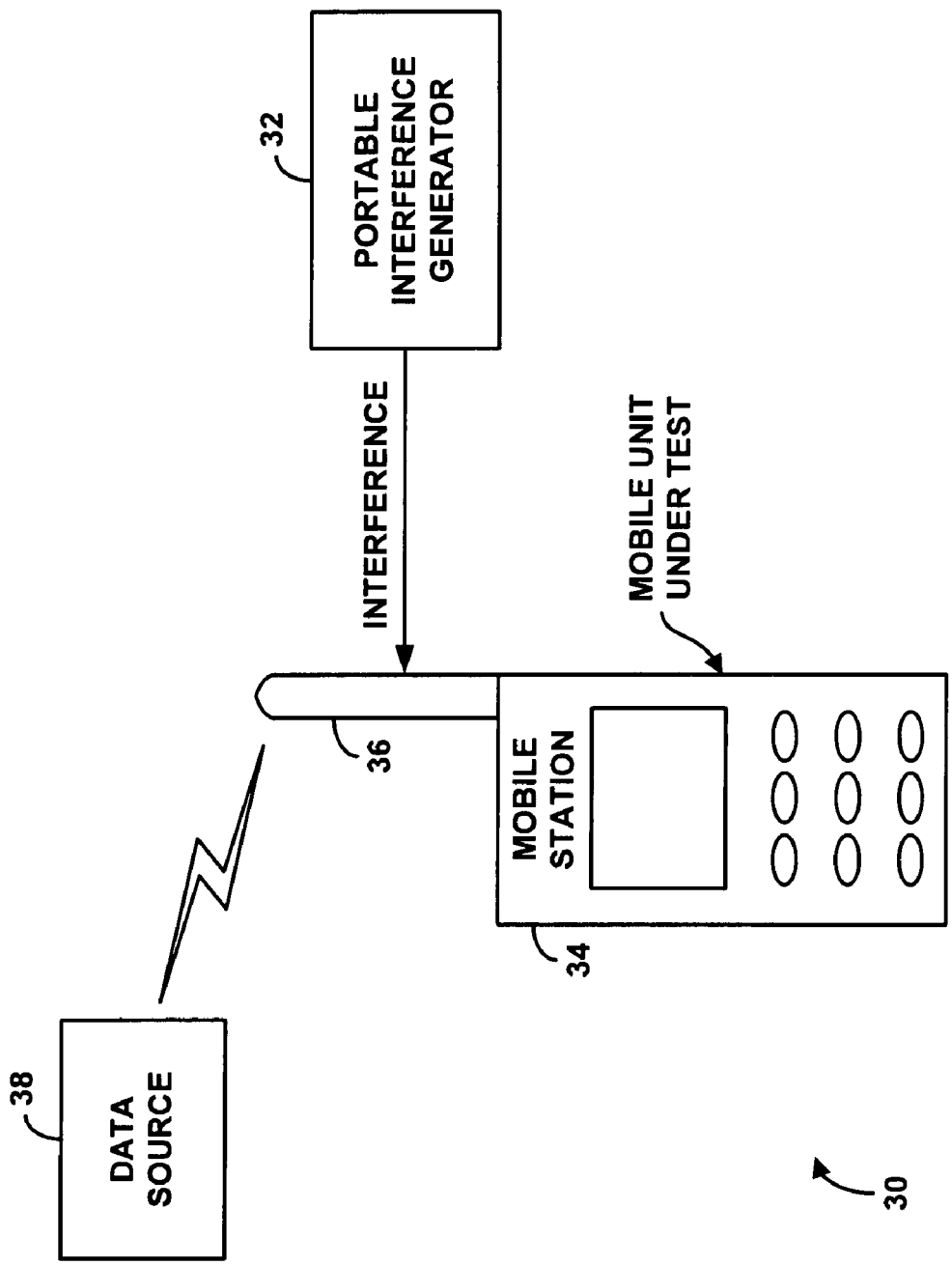
FIG. 2 is block diagram of a test arrangement according to an example embodiment.

FIG. 2 shows an example of a test arrangement 30 including a portable interference generator 32. According to a representative embodiment, portable interference generator 32 is a portable device (e.g., a stand-alone or plug-in unit) that generates interference for inducing frame errors and, in particular, desired frame error characteristics at a mobile unit. Advantageously, by inducing frame errors at a mobile unit, portable interference generator 32 may be used to test behavior of the mobile unit in the presence of frame errors that could normally occur as a result of various forward-channel impairments, for instance.

For example, in test arrangement 30, a mobile unit under test, such as a mobile station 34 (e.g., a cellular phone), wirelessly communicates with a data source 38 via a mobile antenna radiation element, or a mobile antenna 36. Mobile antenna 36 could be a built-in or a retractable type of an antenna. Data source 38 provides a carrier signal having at least one data channel having a plurality of data frames (also referred to hereinafter as a "carrier data signal"). The data source may be an actual BTS or a BTS simulator (e.g., Agilent 8960 Wireless Communication Test Set) as used for mobile testing. In an alternative embodiment, data source 38 may be an active base station transmitting on a forward channel.

In one embodiment, as generally illustrated in FIG. 2, portable interference generator 32 provides carrier-signal interference that is coupled directly (by means of a coupling mechanism not shown) to mobile antenna 36. In one particular embodiment, the interference may be in the form of interfering pulses, or noise bursts, generated by gating a noise signal using a pulse train signal. Preferably, when the pulse interference is coupled to mobile antenna 36, the interfering pulses (or noise bursts) are added to the carrier data signal being received at mobile station 34. This results in the mobile station's digital receiver being unable to properly recover those data frames that overlap, or which are coincident with the interfering pulses, thereby inducing a certain frame error characteristic. The frame error characteristic, which in some embodiments can be specified and/or selected from a number of predefined frame error characteristics, may be, for example, a frame error pattern (e.g., a pattern of random or consecutive frame errors), a frame error rate (e.g., 5% FER, 10% FER, etc.), or a combination of the two.

2. Design Architecture and Operation

Figure 3A:
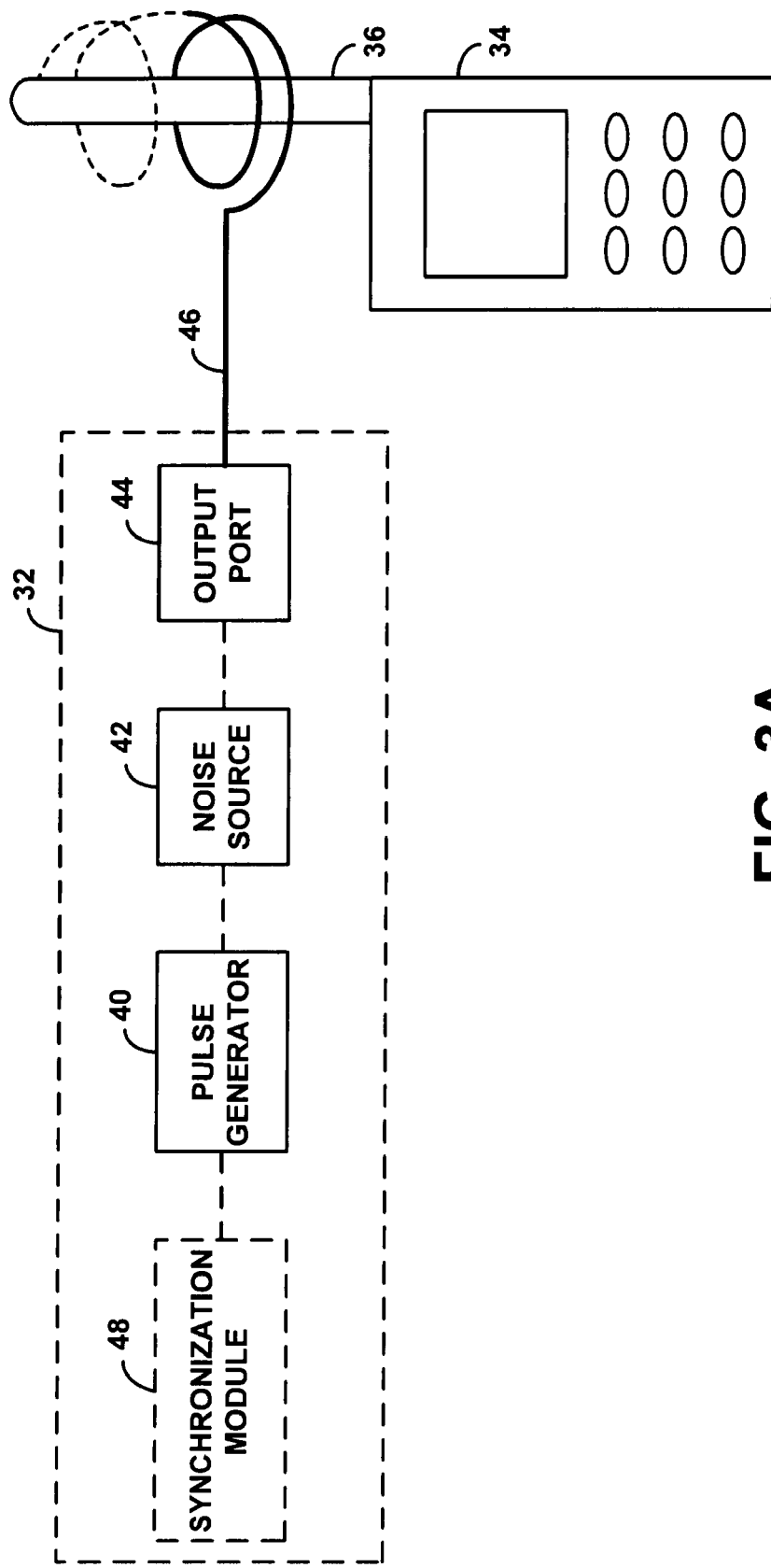
FIG. 3A illustrates a simplified block diagram of one embodiment of a portable interference generator.

FIG. 3A shows a simplified block diagram of one embodiment of portable interference generator 32. As shown in FIG. 3A, portable interference generator 32 preferably includes a pulse generator 40, a noise source 42, an output port 44, and a coupling element 46. As further shown in FIG. 3A, portable interference generator 32 may also include a synchronization module 48. Note that additional elements not shown in the embodiment of FIG. 3A may be included.

As one example, portable interference generator 32 may include voltage source(s) for powering up and control of on-board circuitry. The voltage source(s) may be one or more batteries (e.g., a rechargeable battery) that may power up various circuitry directly and/or through voltage regulator(s)

that typically regulate battery voltage to voltage level(s) required by different circuit components. Alternatively, or in addition to, portable interference generator 32 may include suitable interface(s) for supplying the voltage from external source(s) (e.g., an external battery, a power supply, etc.).

Noise source 42 is used to produce a noise signal that may be narrowband noise (e.g., bandlimited noise-like signal) or narrowband interference (e.g. a continuous wave (CW) signal), or wideband (broadband) noise (e.g., additive white Gaussian noise (AWGN)) or interference (e.g., a wideband RF interfering signal). In one circuit implementation, noise source 42 includes a CW interference generator. One suitable CW interference generator is an RF voltage controlled oscillator (VCO), as commonly used in the communications art for generating local-oscillator (LO) and carrier signals, for instance.

When in operation, the VCO is preferably tuned to the carrier frequency of the forward channel being received at a mobile unit under test, such as mobile station 34 shown in FIG. 3A. One advantage of using a voltage-controlled oscillator is that it can oscillate at multiple frequencies within its tuning range, and a desired frequency can be set by adjusting a tuning (or control) voltage applied to the VCO.

Conveniently, if the VCO is selected to have an operating frequency range that covers at least a receive frequency band of the mobile unit under test, the VCO could substantially provide a CW interfering signal at any frequency within that band (e.g., the CDMA Band Class 1 (1900-MHz band) or a CDMA 800-MHz band). One suitable part for the CDMA Band Class 1 operation is the Minicircuits POS-2120-W VCO optimized for frequencies in the 1060-2120 MHz range. Note that, if appropriate, a discrete VCO circuit can also be used (preferably at lower RF frequencies, such as the 800 MHz band, where stable discrete VCO designs are easier to implement). In addition, oscillator circuits other than voltage-controlled ones (e.g., an oscillator optimized for a single-frequency operation) can be used instead.

Further note that, typically, if the VCO is not locked to a given frequency, the VCO output signal may tend to gradually drift off frequency. For greater accuracy, the VCO may be phase locked using a phase locked loop (PLL (not shown)) or, alternatively, frequency locked using a frequency locked loop (FLL). However, operating the VCO as free-running (i.e., not locked) is also appropriate. Preferably, in the free-running mode, the frequency drift of the VCO output signal will not be substantial.

Additionally, in certain embodiments, noise source 42 may include a modulator, such as a direct quadrature (I&Q) modulator, for modulating the VCO output signal (and thus a CW signal) so as to increase its bandwidth. As an example, in a typical CDMA system, a baseband data signal is modulo-2 added or multiplied with a pseudo-random noise code sequence (PN sequence) made up of chips, which alternate between two binary states in a pseudo-random fashion. The PN sequence has a chip rate of 1.23 Mcps (chips per second). When a narrowband RF carrier signal is quadrature-modulated with the 1.23-Mcps baseband signal for radio transmission, the carrier signal is "spread" into a noise-like signal having a bandwidth of 1.23 MHz (i.e., its power spectrum occupies a bandwidth of 1.23 MHz).

Similarly, the VCO output signal may be modulated with a square wave or a pseudo random code sequence having a period/rate selected according to a desired signal bandwidth, such as a bandwidth wide enough to simulate wideband interference/noise-like signals, for instance. One possible method of generating such signals may be to use a quadrature modulator to "spread" the VCO output signal with a PN sequence according to the CDMA spreading rate of 1.23 Mcps or higher rates (e.g., 2.46 Mcps, 3.69 Mcps, etc.). Other methods of providing narrowband or wideband noise or interference signals may also be possible.

In one example, noise source 42 may include an analog circuit for generating broadband additive white Gaussian noise (AWGN). Such circuits may be constructed, for example, with a combination of noisy element(s), such as zener diodes and/or resistors, and low-noise op amps for amplifying the white noise to desired levels. The use of an analog or digital white noise generator IC module may be also appropriate. In another example, the VCO itself may be directly modulated (via a PLL, for instance) to produce an RF signal having a given center frequency and desired sidebands. Those skilled in the art will recognize that various other ways of producing a noise signal (i.e., noise or interference-like signal) with desired characteristics may be possible.

When added to a forward carrier data signal being received at a mobile unit under test, the noise or interference must be sufficient to thwart the mobile receiver's ability to recover a data frame. That is, the magnitude of a CW interfering signal or other type of narrowband/wideband noise or interference must be sufficiently high.

For instance, consider a test scenario in which a mobile unit under test is receiving a forward carrier data signal from an active base station. The mobile unit may report back certain FER rates or request more power due to low Eb/No values, and the active base station may provide more power as a result of the inner and/or outer loop power control algorithms in an effort to maintain an acceptable FER at the mobile unit. (Note that BTS simulators may be configured not to use forward power control).

Further, in a CDMA system, when the forward carrier data signal is corrupted with narrowband and/or wideband interfering signals and is processed in the front end of the mobile's digital receiver, the correlator (or "despreader") will remove the spreading sequence from the data signal to collapse the signal into its original bandwidth, and, at the same time, will "spread" the interfering signal(s) into a wider bandwidth with a lower-power density. Thus, the interfering signal(s) will typically have less effect on the performance of the receiver.

However, the level of interference provided by portable interference generator 32 is such that desired frame error response at a mobile unit will be achievable. In this regard, portable interference generator 32 may include one or more amplifiers to achieve sufficient interference level. As an example, a MMIC amplifier (e.g., the Minicircuits MAR-6) often used for amplifying RF signals may be added to the output of the VCO to amplify the VCO signal level to a sufficiently high level to cause a frame error. In one preferred test setting, to assure complete interference resulting in a frame error, the interference power may be set 15 dB-20 dB higher than the total received signal (CDMA+AWGN) power as measured at the mobile unit.

Pulse generator 40 generates a gating signal that is used to gate the noise signal provided by noise source 42. The gating signal is preferably a pulse train signal, where the pulse waveform is characterized by a duration characteristic and an interval characteristic. The duration characteristic is the time for which the pulse amplitude is high. The interval characteristic is the time between pulses. Preferably, the noise signal is gated using the pulse train signal such that the noise signal is present at output port 44 when the pulses are high, and will not be present at output port 44 during the intervals between pulses.

By setting the duration characteristic and the interval characteristic, portable interference generator 32 may be configured to provide interference that corrupts a desired number of consecutive frames with a desired number of good frames in between. In addition, when desired, the noise signal may also be gated with a single-pulse signal having a desired duration characteristic such as to provide a constant "jamming" interference that may corrupt a number of consecutive frames over the duration of the pulse. For example, a single pulse having a duration of approximately four seconds may cause sufficient number of frame errors to induce a dropped call at a mobile unit.

A pulse generator suitable for providing the gating signal is preferably a programmable device, such as a PLD (programmable logic device), an FPGA (field programming gate array), a digital controller, such as a microprocessor or a microcontroller (e.g., a Motorola 68705-type of a microcontroller), or a combination of such devices. One advantage of using a digital controller is that it can provide additional functionality for a more versatile design of the portable interference generator. For example, in one embodiment, the generator could be equipped with a display and/or a keypad to provide visual and/or manual interface(s) for interacting with a user, and a digital controller could drive the display and/or keypad functions. The digital controller could also provide digital signals for controlling various on-board circuitry.

The pulse train signal provided by pulse generator 40 may have a predetermined pattern, such as one pulse having a three-frame duration, followed by an interval that is fifty frames long, followed by a pulse having a four-frame duration, and an interval that is forty three frames long, and then repeating that pattern. In an alternative embodiment, the pulse pattern may be randomized such that the pulse duration characteristic, the pulse interval characteristic, or both, may be random. For example, one pulse pattern may be specified to be a constant interval of fifty frames, with a randomized pulse duration of either two or three consecutive frames. Preferably the distribution function is uniform over the range, making the pulse widths of two or three frames equally likely to occur. In other embodiments, other probability distributions may be selected. As another example, the pulse duration may be fixed at, e.g., three frames, while the interval may be a randomized integer number of frames between, e.g., thirty and thirty five. In other embodiments, both the duration and interval may be randomized.

Preferably, any arbitrary pattern that is desired may be programmed into the pulse generator via an on-chip memory (as in the case of a microcontroller, for instance) and/or external on-board memory storage element(s) (not shown), such as an EEPROM and/or flash memory. Portable interference generator 32 may also include programming interface(s) (not shown), e.g., an RS-232 interface, a USB interface, and/or an N-pin connector (e.g., for PLD programming), such that a user equipped with a suitable programming console (e.g., a computer running programming software), could conveniently program the portable interference generator with desired patterns and/or modify the existing ones at anytime.

Figure 3B:
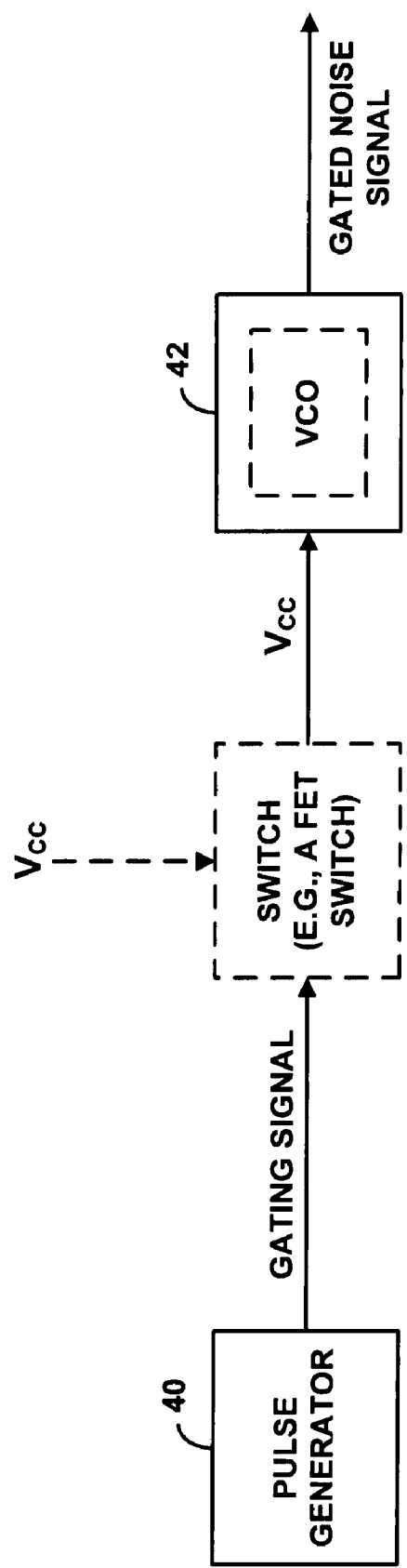
FIG. 3B illustrates one circuit for gating a noise signal.

As noted above, the pulse train signal may be used to gate the noise (source) signal. FIG. 3B illustrates one embodiment in which the noise source includes a VCO (that additionally may be coupled to a modulator, for instance), and in which pulse generator 40 produces an on/off gating signal that may be supplied directly or indirectly through a switch (e.g., a BJT or a FET switch, as known in the art) to the supply voltage ($V_{CC}$) input on the VCO. For example, if the pulse generator is powered up with +5$V_{DC}$, the pulse generator may provide a five-volt TTL signal to a gate terminal of a FET switch (or, alternatively, a gate driver coupled to the gate terminal of the FET switch), where a five-volt signal turns on the switch and a zero-volt turns off the switch. In response, the switch may selectively pass a suitable $V_{CC}$ voltage (e.g., +12 $V_{DC}$) to the $V_{CC}$ input, thereby turning the VCO on and off.

In this regard, note that if the VCO is free-running, a frequency-tuning voltage applied to the VCO may be kept constant. Preferably, the VCO is responsive enough such that it can substantially stay on-frequency as the $V_{CC}$ is pulsed on and off. In an alternative embodiment, as noted above, the VCO may be PLL-locked. In this embodiment, a PLL having sufficient lock times is preferably used such that the VCO remains in-lock as the $V_{CC}$ voltage is pulsed on and off.

In the embodiment illustrated in FIG. 3B, when the amplitude of the pulse train signal is high, the VCO is "on" and outputs a noise signal (that may be further provided to a modulator to format it according to a desired bandwidth), and when the amplitude of the pulse train signal is low, the VCO is "off" such that the noise signal is absent. Turning the VCO on and off in this manner results in a noise burst signal provided to output port 44, wherein the noise signal is present at output port 44 when the pulses are high, and will not be present at output port 44 during the intervals between pulses. In this way, the duration and interval characteristics of the pulse train signal are used to provide or induce the duration and interval characteristics of the noise burst signal.

Figure 3C:
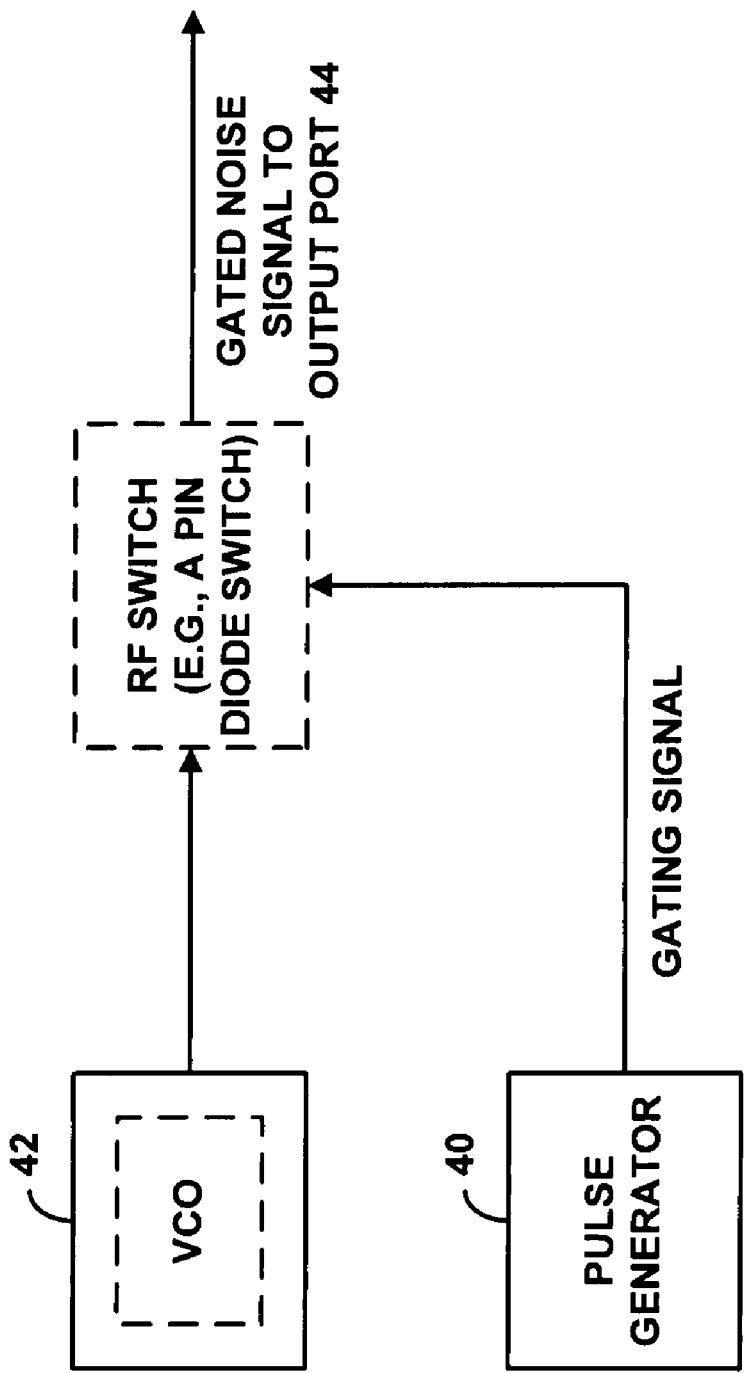
FIG. 3C illustrates another circuit for gating a noise signal.

FIG. 3C illustrates another embodiment in which an RF switch, such as an RF PIN diode switch, may be used for gating the noise signal produced by noise source 42 (e.g., a VCO (as shown) or a VCO coupled to a modulator). In the art, PIN diode switches are often used for switching RF signals. The PIN diode switch operates such that when the diode is forward biased (or "on"), the switch couples the RF signal from the input to the output of the switch. Otherwise, the switch is in a high-impedance state (or an "off" state), in which a high degree of isolation is provided between the switch input and output, preventing the RF signal from being coupled through the switch.

In this embodiment, the gating signal may be used as an on/off control signal for the PIN diode switch. In particular, when the pulse train signal (and thus the gating signal) is provided (directly or indirectly) to the control input of the PIN diode switch, the switch may selectively couple the noise signal present at the switch input to the switch output to thereby provide a noise burst signal, wherein the noise signal (i.e., noise or interference) is present at output port 44 when the pulses are high, and will not be present at output port 44 during the intervals between pulses. In this way, the duration and interval characteristics of the pulse train signal are used to provide or induce the duration and interval characteristics of the noise burst signal. One suitable PIN diode switch is a Series SWX PIN diode switch module from KDI Integrated Products that is optimized for operation in PCS frequency band.

It should be understood, however, that other ways of gating the noise signal may be appropriate. As one example, noise source 42 may include a modulator for modulating the VCO output signal, and the gating signal may be used to gate the $V_{CC}$ input voltage to the modulator (e.g., the 5V RF2480 I&Q modulator IC from RF Microdevices has a vary low maximum turn on/off time (~100 ns) such that it may be feasible to pulse its $V_{CC}$ voltage directly from the pulse generator). Other examples may be possible as well.

In a preferred embodiment, the individual noise bursts are of sufficient duration to be coincident, or overlap in time, with a predetermined number of frames, such as one, two, three, or more frames, depending on the type of testing desired. The pulses (and therefore the noise bursts) may be asynchronous or synchronous with the data frames. In particular, in certain embodiments, portable interference generator 32 includes synchronization module 48 for providing a frame synchronization signal to the pulse generator to synchronize the pulses with the data frames contained in a carrier signal being received by a mobile unit under test. (Note that as used herein, the term "module" may literally refer to a self-contained circuit unit or some other type of circuit or a combination of circuits performing given function(s)).

For example, in a CDMA system, data frames have typically 20-ms durations and are transmitted at a rate of 50 per second. All CDMA base stations are synchronized to the Global Positioning System (GPS) even-second clock (i.e., one-pulse-every-other-second timing signal synchronized to even seconds in GPS time) to maintain system time. Each BTS continuously broadcasts pilot channel signals of respective cell sectors served by the BTS, where each pilot signal is identified by a PN offset and a carrier frequency. The PN offset assigned to a given sector in the CDMA system defines a unique time offset of the PN sequence that is synchronized to the GPS even-second clock and used by all base stations. A mobile station operating in the given BTS sector uses the sector pilot signal as a phase reference for coherent demodulation of data communications from the BTS.

Synchronization module 48 may take various forms. In one example, the synchronization module may include a front-end GPS receiver module for receiving and demodulating GPS signals to provide the GPS even-second clock signal. The GPS even-second clock signal may be used as a time base for synchronizing the pulse train signal generated by pulse generator 40 with data frames contained in a carrier signal being received by a mobile unit under test (i.e., the pulses are synchronized with the data frames).

In one test setup, for example, the mobile unit under test may be receiving the carrier signal from a BTS simulator that uses the GPS even-second clock signal as a timing reference. As such, the BTS simulator and the pulse generator may be synchronized to the same time reference signal. Note that an on-board GPS antenna module may be integrated into portable interference generator 32 or, alternatively, the portable interference generator may include an antenna port (not shown) for connecting to an external antenna.

In another embodiment, the synchronization module may include CDMA front-end analog and baseband chipsets often used in CDMA mobile handsets for processing CDMA signals. Such chipsets (that may also be designed to process GPS signals) are, for example, available from Qualcomm Corporation. Alternatively, a complete CDMA-processing module, such as the C18 CDMA module (with GPS functionality) from Motorola, may be used instead. Advantageously, in this particular embodiment, portable interference generator 32 may be tuned to and synchronized with a CDMA pilot signal from an active base station. This may be particularly useful for in-field testing, where a mobile radio under test maybe communicating with the active base station. The portable interference generator may include an antenna port (not shown) for connecting to an external antenna for capturing CDMA signals. Preferably, any such antenna port will be properly RF-isolated from output port 44.

Note, however, that other examples of suitable types of synchronization modules may also be possible. Further, in some test setups (e.g., those using a BTS simulator), synchronizing data frames and the generated pulses to time-base reference signals other than the even-second clock-based timing signal is also possible.

As noted above, the gated noise signal is provided to output port 44. The output port may be coupled to noise source 42 directly or indirectly (e.g., via an amplifier, an RF switch, and/or impedance-matching network). The output port provides an interface for connecting to coupling element 46, which in turn provides the gated noise signal to a mobile unit under test such that the gated noise signal is added to a carrier data signal being received at the mobile unit.

In the embodiment of FIG. 3A, coupling element 46 couples the gated noise signal directly from output port 44 to an antenna radiation element on a mobile unit, such as mobile station 34. However, other ways of providing the gated noise signal to the mobile unit may also be possible (e.g., direct-coupling the gated noise signal to an RF test jack on the mobile unit using an RF cable may be possible).

Coupling element 46 may be formed from a short piece of a coaxial wire (or a coaxial cable), where the coaxial wire/cable typically has an outer shield and a center conductor. One end of the coaxial wire may be properly connected to output port 44 while at the other end, a portion of the outer shield may be removed to expose the center conductor. The exposed center conductor may be then placed in proximity of an antenna radiation element on a mobile unit to couple (over the air) the gated noise signal to the antenna radiation element.

In general, the distance at which the (exposed) conducting portion of coupling element 46 is placed from the antenna radiation element on the mobile unit will depend on the amount of signal coupling desired. Typically, by placing the conducting portion closer to the antenna radiation element (e.g., by physically touching the antenna radiation element), stronger signal coupling may be achieved (i.e., more of the gated noise signal may be coupled to the antenna radiation element), although the amount of signal coupling may not substantially change within a certain distance from the antenna radiation element.

In one example in FIG. 3A, the exposed center conductor may be looped (or curled) in a close proximity around a mobile antenna radiation element, such as mobile antenna 36, to form a "curly wire"-like coupling element, coupling the interference (i.e., the gated noise signal) to the mobile antenna, and thereby adding the interference to a carrier data signal being received at the mobile antenna. In particular, when the interfering pulses of sufficient strength are added to the carrier signal, the mobile station's digital receiver will be unable to properly recover those data frames that overlap, or which are coincident with the interfering pulses, thereby resulting in frame errors.

Note that, although in FIG. 3A the mobile unit is shown as having an external antenna radiation element (e.g., a built-in or a retractable type of a mobile antenna), in some cases, an antenna radiation element may be located internally within a mobile unit. In such cases, the (exposed) conducting portion of coupling element 46 may be placed (externally) in proximity of the location of the antenna radiation element within the mobile unit. For example, the center conductor may be conveniently attached (using any suitable means) to the body of the mobile unit within the area where the antenna radiation element is located internally within the mobile unit. Other examples may be possible as well.

Output port 44 may be any suitable interface to which coupling element 46 may be connected (e.g., a coaxial connector (e.g., a 50-ohm SMA connector)), an on-board interface to which the coupling element may be soldered, or some other means). If necessary, the output port may be impedance-matched to the rest of the circuit through impedance matching network(s). The coupling element may be permanently attached to the output port or may be detachable. Further, although FIG. 3A illustrates the "curly wire" coupling element as having one main wire loop around mobile antenna 36, more wire loops may be formed around the mobile antenna (as shown in dashed lines).

Typically, a "loosely" coupled single-loop element, as shown, will be sufficient to provide substantially tight signal coupling (e.g., on the order of 10 dB) to the mobile antenna. (That is, the interference level measured at the mobile antenna will be approx. 10 dB lower than the level measured at output port 44). To assure complete interference resulting in a frame error, the interference level provided at output 44 may be optimized accordingly to account for the amount of signal loss due to the coupling factor (e.g., 10 dB) of coupling element 46.

The coupling element shown in FIG. 3A will typically radiate little RF energy away from an antenna element of a mobile unit under test. Thus, the interference power will be substantially concentrated directly onto a carrier data signal being received at the mobile antenna, thereby minimizing the risk of interfering with signals being received at other mobile units that may be operating near by. Further, in general, the interference levels needed to thwart a digital receiver's ability to recover a data frame contained in a low-power, noise-like CDMA signal will be substantially low, thereby further minimizing the risk of any unwanted interference leakage from the portable interference generator to other mobile units.

Figure 4:
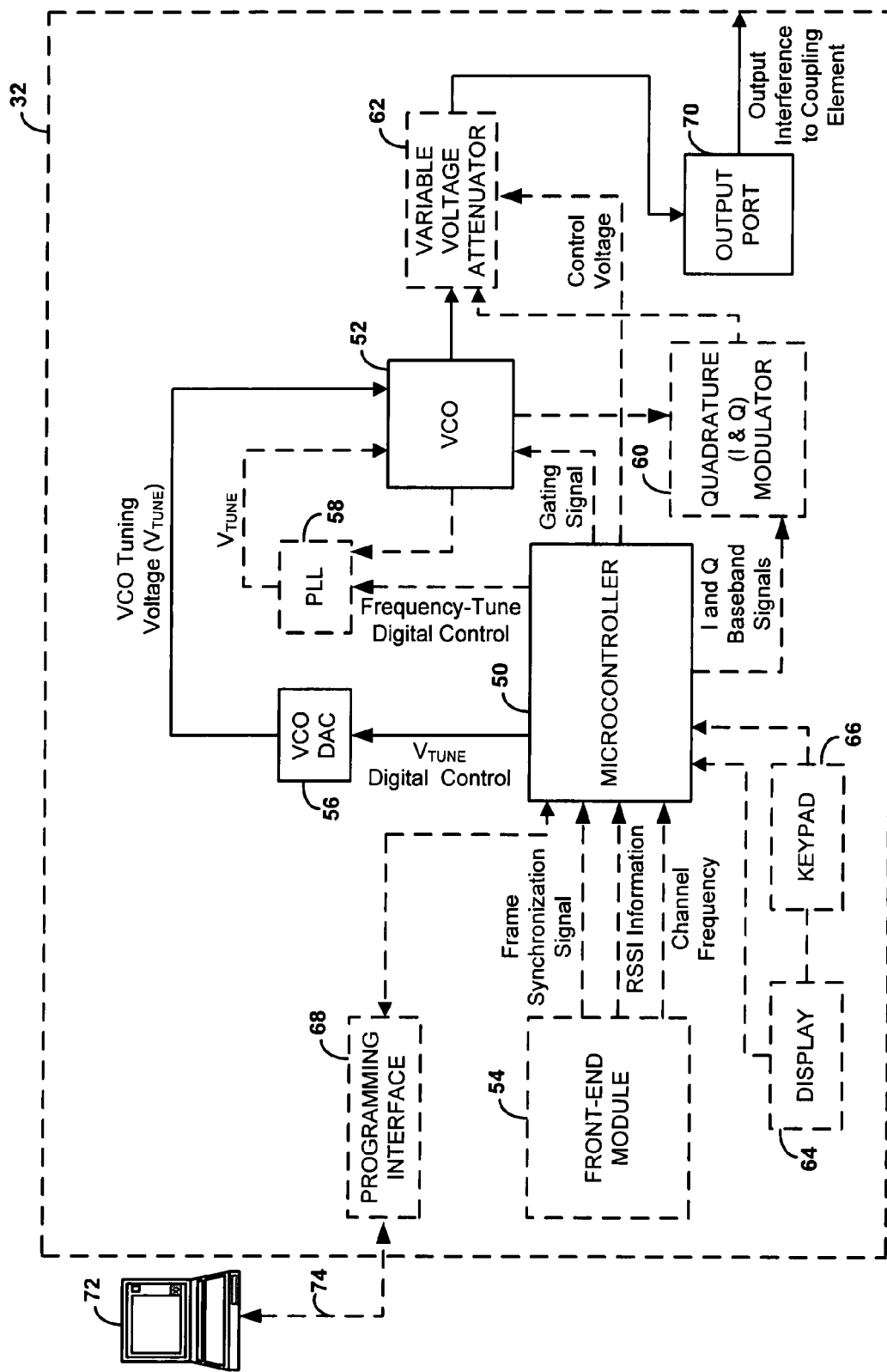
FIG. 4 illustrates a block diagram of a particular embodiment of the portable interference generator.

Although FIG. 3A generally illustrates portable interference generator 32, various details are possible. FIG. 4 illustrates one more detailed example of functional components of portable interference generator 32.

As shown in FIG. 4, the portable interference generator may include a digital controller, such as a microcontroller 50 (which, in an alternative embodiment, could also be a microprocessor) that may digitally control various functions and modes of the portable interference generator. The microcontroller may be programmable via a programming interface 68 and a serial connection 74 using a computer that may be a portable computer, such as a laptop 72.

As shown, the microcontroller may function to generate gating signal(s), such as pulse train signal(s). In this regard, the microcontroller may be programmed with a number of predetermined pulse patterns. In one example, as shown, the microcontroller may provide the gating signal(s) to a VCO 52. In one another example (not shown), the microcontroller may provide the gating signal(s) to an RF switch (e.g., a PIN diode switch) coupled to the output of VCO 52 or to the output of a quadrature modulator 60 that may coupled to the output of the VCO. Other examples may also be possible.

Further, as shown in FIG. 4, the microcontroller may be serially interfaced with a front-end module 54, such as the Motorola C18-type of a CDMA-processing module or other type of front-end modules(s) (e.g., CDMA mobile handset chipset(s)), for front-end processing of timing signals (e.g., a CDMA pilot signal and/or a GPS signal) and/or other forward signals being transmitted to a mobile unit under test. For example, the front-end module may be configured to receive (e.g., via an antenna not shown) and process timing signals and carrier data signals being transmitted to the mobile unit under test. The front-end module may then provide various information regarding front-end processed signals to the microcontroller, which may use the information to control characteristics of the output interference provided by portable interference generator 32.

As one example, the front-end module may provide the microcontroller with a frame synchronization signal for generating a pulse train signal that is synchronous with the data frames contained in the carrier signal. The frame-synchronization signal may be derived, for example, from a CDMA pilot signal or directly from the GPS signal. The front-end module may also provide the microcontroller with information regarding channel frequency (or carrier frequency) of the received carrier signal. In response, the microcontroller may provide suitable control signal(s) to tune the portable interference generator to the same channel frequency. For instance, in the embodiment of FIG. 4, the microcontroller may cause for tuning VCO 52 to the same channel frequency.

In one embodiment, VCO 52 may be a free-running VCO and the microcontroller may provide a digital control word to a VCO DAC (digital-to-analog converter) 56 functioning to output a corresponding VCO tuning voltage. Although not shown, the DAC output may be coupled to a DC/DC converter to increase the DAC output voltages to levels needed to tune the VCO within desired frequency range. Alternatively, if the VCO output signal is phase locked, the microcontroller can in a similar way control a PLL 58 by providing programming signals to the PLL to lock the VCO output signal onto a desired channel frequency.

In another example, the front-end module may provide the microcontroller with information regarding signal strength of the received carrier data signal. For example, after tuning to the channel frequency of the received signal, the front-end module may be configured to automatically provide the microcontroller with an RSSI (received signal strength indicator) signal. Based on the RSSI signal from the front-end module, the microcontroller may control the signal strength of the output interference at an output port 70 as desired.

For example, as illustrated in FIG. 4, the microcontroller may control the level of the output interference by means of a variable-voltage attenuator 62 (via a DAC, for example, not shown) that may be coupled to the output of VCO 52 (or, alternatively, to the output of quadrature modulator 60 as shown). As known in the art, variable-voltage attenuators are attenuators that provide a variable level of signal attenuation that may be controlled with a control voltage applied to the attenuator. Accordingly, the microcontroller may be programmed to control (via control voltages from a DAC, for example) the levels of signal attenuation through variable-voltage attenuator 62. This function may be particularly useful for a gradual introduction of frame errors at a digital receiver.

Specifically, the microcontroller may be programmed to increase the signal strength of the output interference at just above the RRSI level (e.g., in fixed or variable step increments from a predefined nominal level of the output interference) so as to gradually start inducing frame errors at a digital receiver. For example, at some output interference levels, the ability of the digital receiver to recover a data frame may be "hit or miss". The output interference level may be then gradually increased to a given level at which the digital receiver is not able to recover a data frame whenever the output interference is present. For example, whenever a data frame in the carrier data signal overlaps with an output interfering pulse at the given level, a frame error will result. Alternatively, or in addition to, the RSSI signal from the front-end module may also be used by microcontroller 50 to provide other type(s) of signal strength control, such as signal amplification.

Further, as shown in FIG. 4, the microcontroller can also be programmed to provide I (in-phase) and Q (quadrature) baseband signals to quadrature modulator 60 for "spreading" narrowband signals, such as a VCO output signal, to desired bandwidths (e.g., wideband noise-like signals). In this regard, the microcontroller may be programmed with a number of predetermined baseband waveforms (e.g., square wave or pseudo-random code sequence waveforms) having respective periods/rates that may be selected according to a desired signal bandwidth of the output interference. In addition, the microcontroller may control the I and Q input signals in such way as to provide unmodulated VCO signals out of the modulator. This way, the spreading modulator may be used to provide a dual-signal operation in which either a narrowband or a wideband noise signal may be produced based on a desired type of output interference.

As further shown in the embodiment of FIG. 4, portable interference generator 32 may also include suitable interface(s), such as a display 64 and a keypad 66, to facilitate interaction with a user, such as to provide the user with control over various functionality of the device.

Figure 5:
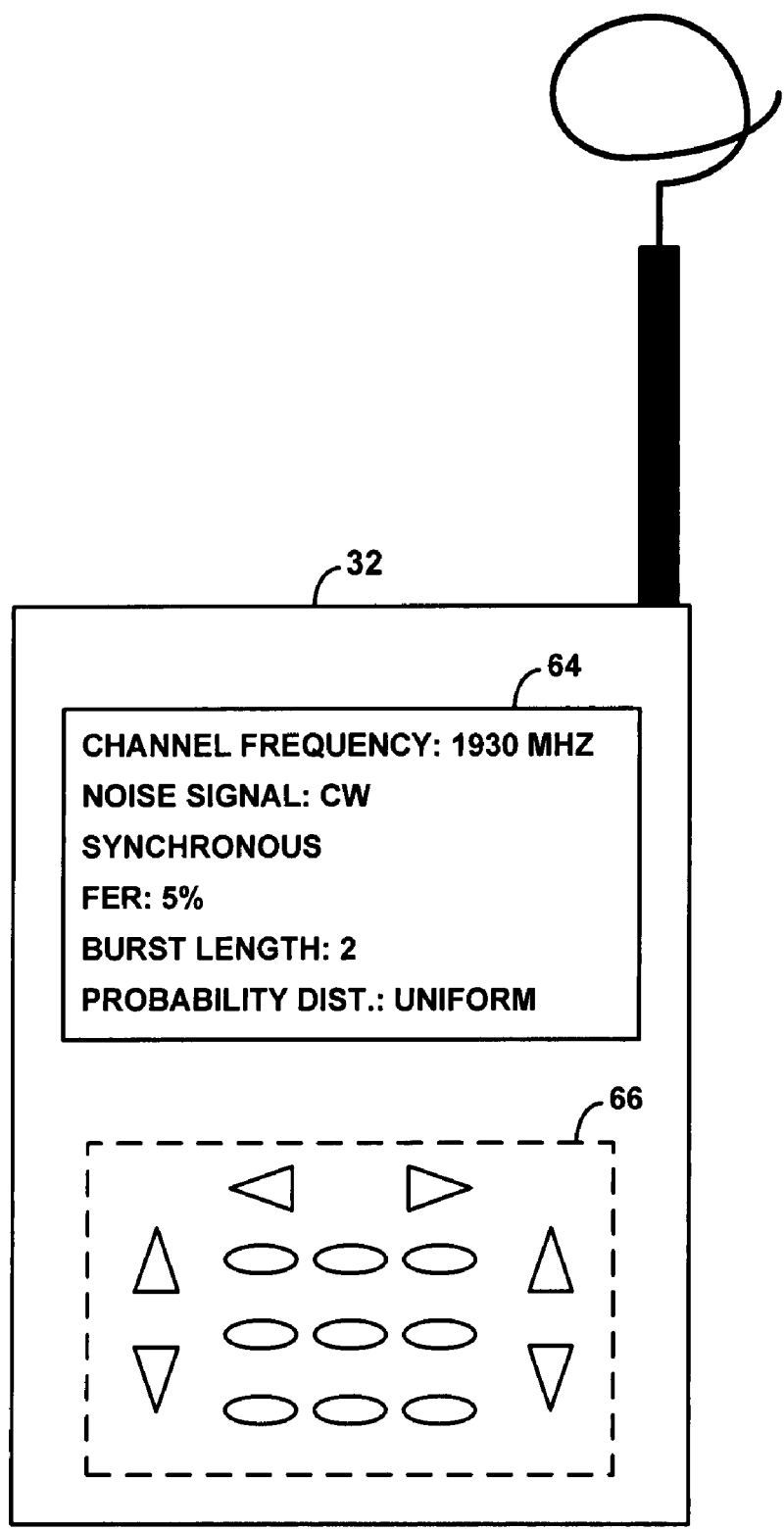
FIG. 5 illustrates one external view of the portable interference generator including a keypad and a display.

FIG. 5 illustrates one external view of digitally-controlled portable interference generator 32 of FIG. 4 including display 64 and keypad 66. Note that a coupling element may be attached to the body of the device in a different way than shown in FIG. 5. Further, in the embodiment of FIG. 5, the portable interference generator is preferably a pocket-sized/hand-held device. It should be understood, however, that in other embodiments, portable interference generator 32 may not be necessarily equipped with any external user interface(s) and may take other forms, such as a circuit module or a plug-in unit to another device.

In the embodiment of FIG. 5, a user will be preferably able to select and control various modes of operation and/or settings of the portable interference generator. As some examples, using keypad 66 (and/or some other input mechanism(s) (e.g., side scroll buttons)) and/or display menus, the user may be able to select a desired channel frequency (e.g., type in or select it from a menu) or, alternatively, set the portable interference generator to an automatic mode in which the device (via the front-end module as shown in FIG. 4) could automatically tune to the channel frequency (e.g., 1930 MHz).

Further, the user could select desired type of interference, such as narrowband noise or interference (e.g., a CW signal), or wideband noise or interference. In this regard, for example, the user could view available spreading rates and/or predefined modulating waveforms for generating desired type of wideband interference. The user may also be presented with choices for selecting frame-synchronous or asynchronous operation. In yet another example, the user could control the desired level of interference or could turn on any available automatic-mode function(s) to provide such control (e.g., the portable interference generator could automatically control interference level attenuation for gradually inducing frame errors at a mobile unit under test, as discussed above). The user could also change any automatic-mode settings based on user preferences. In addition, although not shown in FIG. 4, portable interference generator 32 may include data storage element(s) for saving user preferences and/or user-defined programs and/or settings.

Further, the user could select one of a number of predetermined pulse patterns that may be used to induce a corresponding desired frame error characteristic, such as a desired frame error pattern and frame error rate. In one particular embodiment, the user may select desired FER by typing it into a data field on the display or selecting it from a display menu, and select a desired number of consecutive frame errors, or burst length, by again, typing it into a data field on the display or selecting it from a display menu. The combination of the two parameters (FER and burst length) may be then mapped to a pulse pattern having the required duration and interval characteristics. For example, if a FER of 5% is selected, and a burst length of three, then an internal pulse generator, such as microcontroller 50, may provide a pulse train signal having a pulse duration of three frames and an interval of fifty seven frames.

In another example, the portable interference generator may provide for selection of a randomly distributed burst length of "one to two", "two to three", etc. If a FER of 5% is selected and burst length of "two to three" is selected, the pulse generator may provide a pulse having a duration of either two or three frames (randomly, but equally likely), and an interval of forty seven frames. Other patterns may also be provided if the interval characteristic is not constant.

In yet another example, the user may select a constant-interference mode in which portable interference generator 32 may provide a constant "jamming" interference that may induce consecutive frame errors over a desired period of time. For example, the user could set the duration characteristic to a desired time interval and set the interval characteristic to zero. Alternatively, or in addition to, the portable interference generator may be programmed accordingly to provide an automatic option for providing this type of interference.

For instance, in response to user selection of such option, the internal pulse generator may be programmed to generate a gating signal in the form of a single-pulse signal whose duration may be controlled by a user, i.e., the pulse signal may be turned off in response to an input from a user. The internal pulse generator may also be programmed with single-pulse signals of various durations for user selection. Many other examples may also be possible.

3. Applications

By inducing frame errors at a mobile unit, such as mobile station 34, portable interference generator 32 may be useful in various mobile tests.

In one particular test application, portable interference generator 32 may be used in evaluating performance of a mobile station's vocoder in response to various frame error patterns and rates as induced at the mobile station. In one possible test procedure, a test system may be operated such that there are no frame errors for a period of time, say ten seconds. The vocoder may be rated using a PESQ or PAMS score. One would expect a rating of four or five. Then a user could select the desired FER (and optionally a burst duration, or number of consecutive frames), which may be translated into a duration characteristic and/or an interval characteristic.

In some preferred embodiments, the FER rate may be verified. For example, referring back to test arrangement 30 of FIG. 2, the forward frame erasures may be reported by mobile station 34 via the reverse RF link using Service Option 55, and may be displayed on data source 38, which may be a base station simulator. Preferably, no forward power control is used in the base station simulator. The vocoder performance is then rated again using the PESQ or PAM scores, or in the case of TTY performance, the character error rate may be used.

In other mobile test evaluations, portable interference generator 32 may be useful for producing predictable FERs, dropped calls, distorted speech, Real Time Protocol (RTP) retries (as, e.g., in streaming of real-time audio data), TTY character errors, and/or other types of frame-error responses at a mobile unit.

In one particular example, portable interference generator 32 may be useful in simulating the effects of signal power fluctuations caused by Rayleigh fading. In particular, in Rayleigh fading, multipath components of a transmitted signal may add destructively causing so-called "deep fades" of the signal. The loss of signal strength due to deep fades often renders a digital receiver unable to recover data frames contained in the signal, causing a large number of consecutive frame errors during the period when the signal is experiencing a deep fade. Thus, inducing consecutive frame errors at a mobile unit under test and evaluating mobile behavior in response to such type of errors may be useful.

Further, portable interference generator 32 may facilitate mobile station testing, which often involves the use of bulky lab instruments and/or multiple-instrument test setups that make it difficult (if not impossible) to conduct the testing in a field, for example. With the portable interference generator, a user could simulate various test conditions with a single device and could conveniently test mobile units at different test locations, including laboratory as well as the field.

4. CONCLUSION

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention.

We claim:

1. A portable device for inducing a desired frame error characteristic at a mobile unit, wherein the mobile unit is receiving a carrier signal having at least one data channel having a plurality of data frames, the portable device comprising:
    a noise source for providing a noise signal;
    a pulse generator for providing a gating signal, wherein the gating signal is used for gating the noise signal according to the desired frame error characteristic;
    an output port electrically coupled to the noise source for receiving the gated noise signal; and
    a coupling element for connecting to the output port, wherein the coupling element is operable to provide the gated noise signal to the mobile unit such that the gated noise signal is added to the carrier signal being received at the mobile unit to induce the desired frame error characteristic.

2. The portable device of claim 1, wherein the coupling element couples the gated noise signal directly to an antenna radiation element of the mobile unit.

3. The portable device of claim 1, wherein the gating signal is a pulse train signal, and wherein the pulse train signal has a duration characteristic and an interval characteristic.

4. The portable device of claim 3, wherein the gated noise signal comprises discrete noise bursts of radio frequency noise, the noise bursts having a duration characteristic and an interval characteristic, and wherein the duration characteristic and the interval characteristic of the pulse train signal induce the duration characteristic and the interval characteristic of the noise bursts.

5. The portable device of claim 4, wherein the duration characteristic of the noise bursts is configured to provide individual noise bursts of sufficient duration to be coincident with a predetermined number of frames.

6. The portable device of claim 4, wherein the noise bursts are synchronous or asynchronous with the data frames.

7. The portable device of claim 1, wherein the gating signal has a duration characteristic, and wherein the duration characteristic is a time duration for which the noise signal is present at the output port.

8. The portable device of claim 1, further comprising a radio frequency switch, wherein a switch input is electrically coupled to the noise source and a switch output is electrically coupled the output port, and wherein the pulse generator provides the gating signal to a control input of the switch such that the switch couples the switch input to the switch output according to the desired frame error characteristic.

9. The portable device of claim 1 wherein the frame error characteristic includes a frame error pattern.

10. The portable device of claim 1 wherein the frame error characteristic includes a frame error rate.

11. The portable device of claim 1, further comprising a synchronization module electrically coupled to the pulse generator for providing a frame synchronization signal to the pulse generator, wherein the pulse generator synchronizes the gating signal with the frame synchronization signal.

12. The portable device of claim 1 implemented as a hand-held testing device.

13. A portable device for inducing a desired frame error characteristic at a mobile unit, wherein the mobile unit is receiving a carrier signal having at least one data channel having a plurality of data frames, the portable device comprising:
    a noise source for providing a noise signal;
    a programmable pulse generator for providing a gating signal having a duration characteristic and an interval characteristic, wherein the gating signal is used for gating the noise signal to produce a noise burst signal;
    an output port electrically coupled to the noise source for receiving the noise burst signal; and
    a coupling element for connecting to the output port, wherein the coupling element couples the noise burst signal directly to an antenna radiation element of the mobile unit such that the noise burst signal is added to the carrier signal being received at the mobile unit to induce the desired frame error characteristic.

14. The portable device of claim 13, wherein the coupling element includes a coaxial element having a center conductor and an outer shield, and wherein a portion of the center conductor is curled around the antenna radiation element of the mobile unit, the outer shield being removed around the portion.

15. A digitally-controlled portable device for inducing a desired frame error characteristic at a mobile unit, wherein the mobile unit is receiving a carrier signal having at least one data channel having a plurality of data frames, the digitally-controlled portable device comprising:
    a digital controller;
    a front-end module serially coupled to the digital controller for providing the digital controller with information regarding signal characteristics of the carrier signal;
    a noise source for producing a noise signal, wherein the noise signal is gated according to the desired frame error characteristic using a gating signal provided by the digital controller;
    an output port electrically coupled to the noise source for receiving the gated noise signal; and
    a coupling element for connecting to the output port, wherein the coupling element is operable to provide the gated noise signal to the mobile unit such that the gated noise signal is added to the carrier signal being received at the mobile unit to induce the desired frame error characteristic.

16. The digitally-controlled portable device of claim 15, wherein the front-end module provides the digital controller with an indication of a signal strength of the carrier signal, and wherein the digital controller controls a level of the gated noise signal according to the indication.

17. The digitally-controlled portable device of claim 15, wherein the front-end module provides the digital controller with an indication of a carrier frequency of the carrier signal, and wherein the digital controller provides a control signal to tune the noise source to the carrier frequency.

18. The digitally-controlled portable device of claim 15, further comprising a user interface, wherein a user can control one or more functions of the device via the user interface.

19. The digitally-controlled portable device of claim 15, further comprising a user interface, wherein a user can control one or more signal characteristics of the gated noise signal via the user interface.

20. The digitally-controlled portable device of claim 15, wherein the front-end module further provides the digital controller with a frame synchronization signal.

* * * * *